United States Patent
Jacobs et al.

(10) Patent No.: US 7,444,376 B2
(45) Date of Patent: Oct. 28, 2008

(54) TECHNIQUES FOR CREATING AN ACTIVATION SOLUTION FOR PROVIDING COMMERCIAL NETWORK SERVICES

(75) Inventors: Phillip T. Jacobs, Fort Collins, CO (US); David J. Lachelt, Fort Collins, CO (US); Charles E. Fowler, Fort Collins, CO (US); Steve J. Constant, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1034 days.

(21) Appl. No.: 10/444,812

(22) Filed: May 22, 2003

(65) Prior Publication Data

US 2004/0236853 A1    Nov. 25, 2004

(51) Int. Cl.
*G06F 15/16* (2006.01)
*G06F 15/173* (2006.01)

(52) U.S. Cl. .................. 709/206; 709/220; 709/226

(58) Field of Classification Search ............ 709/201–3, 709/229, 226
See application file for complete search history.

(56) References Cited

U.S. PATENT DOCUMENTS

| 5,889,953 | A * | 3/1999 | Thebaut et al. ............. 709/221 |
| 6,041,347 | A * | 3/2000 | Harsham et al. ............ 709/220 |
| 6,170,009 | B1 * | 1/2001 | Mandal et al. .............. 709/223 |
| 6,901,440 | B1 * | 5/2005 | Bimm et al. ................ 709/223 |
| 2003/0191781 | A1 * | 10/2003 | Civanlar et al. ............ 707/200 |

* cited by examiner

*Primary Examiner*—Paul H Kang

(57) ABSTRACT

A method of creating an activation solution for commercial network services is disclosed. The method employs modular, reuseable building block archive files, which represent a higher level of abstraction than simple atomic tasks. After the building block archives files suitable for addressing the needs of an activation solution are selected, innovative logic combines these building block archives to more quickly create an activation solution than is possible working from individual atomic tasks.

23 Claims, 13 Drawing Sheets

TECHNIQUES FOR CREATING AN ACTIVATION SOLUTION FOR PROVIDING COMMERCIAL NETWORK SERVICES

BACKGROUND OF THE INVENTION

Networking technologies, both wired and wireless, have changed the way people play and work in fundamental ways. For example, in the span of only a few years, the Internet has become an important communication and commercial channel for many companies and organizations. For some companies, organizations, and individuals, the availability and reliability of commercial network services (such as Internet hosting and other hosted networking services) are increasingly becoming a critical factor in their success.

The demand for commercial network services ("CNS") has in turn created a market wherein various service providers ("SP's") compete to provide the hardware and software infrastructure for fulfilling commercial network service needs (such as shared web hosting needs) of commercial network service customers. In the commercial network service market, a SP owns or controls a pool of hardware and software resources. Responsive to the particular requirements of a given commercial network service customer, a SP would configure a subset of the SP's available hardware and software resources to fulfill the commercial network service need.

The process of configuring the required hardware and software resources of a SP to furnish the required commercial network service to a customer is called service activation. Service activation thus bridges the gap between a customer commercial network service requirements and the SP's infrastructure configuration.

Generally speaking, SP's strive to perform service activation rapidly, accurately and in a cost-efficient manner. Rapid and accurate service activation tend to increase customer satisfaction and give the SP a competitive edge in the highly competitive commercial network service market.

Since the number of customers served by a given SP may be quite numerous, and the commercial network service requirement may vary from customer to customer, most SP's tend to employ highly specialized software and processes, known as a service activation solution, to automate as much as possible the service activation task. Furthermore, given the complexity of modern hardware and software, many SP's have discovered that they either lack the in-house talent necessary to develop the activation solution internally and/or it is more economical and efficient to contract the task of creating an activation solution to outside experts. The SP's demand for activation solutions, in turn, creates a market for system integrators ("SI's"), who are contracted by the SP's to create service activation solutions to enable the SP's to efficiently and rapidly activate the commercial network service for the SP's customers.

FIG. 1 illustrates the relationship between system integrators ("SI's"), service providers ("SP's") and the SP's customers in the context of service activation. As shown in FIG. 1, a customer 102 may request commercial network service by furnishing commercial network service requirement 104 to a service provider 106. In the example of FIG. 1, customer 102 may request a shared web hosting service, and thus requirement 104 may include specifications such as the specific underlying servers (e.g., Unix), the quality of service (e.g., gold quality), the amount of disk space needed (e.g., 200 MB), the URL for the website to be hosted (e.g., www.my-company.com), as well as other services such as anonymous FTP, web response time monitoring, and the like.

Requirement 104 may be inputted into an activation solution 110, which is provided to service provider 106 by system integrator 112. Generally speaking, activation solution 110 is created in advance by system integrator 112 for use by service provider 106. Depending on the particulars of customer requirement 104, activation solution 110 employs an appropriate subset of the hardware and software infrastructure 120 available to the SP, performs tasks 122 to appropriately configure the selected infrastructure subset. The result is a commercial network service 124 that satisfies the requirement 104 set forth by customer 102.

In the current art, the process for creating an activation solution (e.g., activation solution 110) for a SP generally involves a substantial amount of time and effort on the part of the SI. FIG. 2 is a flowchart illustrating a typical activation solution creation process, which is performed by a SI to create an activation solution for a SP. In block 202, the SI receives the service definition from the SP, including a detailed description of the commercial network service offerings to be activated by the activation solution as well as the process steps that the SP employs to activate a commercial network service for a customer.

In block 204, the SI analyzes the service definition furnished by the SP to determine whether there existed pre-built plug-ins, e.g., components, for handling some or all of the tasks to be performed in activating a service. If a required plug-in is not available, the SI either creates or obtains the plug-ins (206), e.g., from other service activator professionals who may sell or share such plug-ins.

Once all the plug-ins are ascertained to be available, the SI then analyzes (208) the individual atomic tasks that must be performed, the data I/O requirements of individual atomic tasks, as well as the sequencing and grouping of the atomic tasks in order to achieve service activation or an aspect of the service activation. In block 210, the SI further gains education on the process for developing compound tasks, activation workflows, inventory structure, and inventory population. A compound task is a group of atomic tasks to be performed together in a predefined sequence. An activation workflow is an encoding of the business process that the SP uses to carry out the provisioning or activation of an aspect of the commercial network service (CNS). Inventory structure refers to the inventory schema, or inventory map, of the hardware and software resource necessary to activate a given activation service request. Inventory population refers to the process by which instances of the hardware and software resources available to the SP are populated into the inventory structure. Generally speaking, SI needs to be familiar with the resources available to the SP as well as the process by which a subset of those resources can be appropriated for a particular commercial network service to be activated and the process steps which the SP employs to appropriately configure the selected subset of resources.

Once the SI gains the necessary knowledge regarding compound tasks, activation workflows, inventory structure, and inventory population, the SI may then construct the required compound tasks (212) by, for example, manually editing XML (Extensible Markup Language) files to combine specific atomic tasks. The constructed compound tasks are then tested in block 214. If the compound tasks function as expected, the SI then develops, in block 216, the inventory structure to support activation. In so doing, the SI may develop the inventory schema (i.e., a map of the required hardware and software resource) along with access functions required to query and update the inventory database.

At this point, the SI has ascertained the type of data contained in the customer activation request, the inventory structure, the compound tasks to be invoked, and the process steps that the SP employs to activate a commercial network service (CNS). In block 220, the SI then constructs the required activation workflows to connect the activation tasks (compound task execution, inventory operations, and the like). In block 222, the developed activation workflows of block 220 are tested in the context of the compound tasks and the SP's inventory. If these activation workflows do not function as expected, the SI ascertains in block 224 whether the problem resides with the compound tasks created in block 212, the inventory developed in block 216 or the workflows developed in block 220. Depending on the assessment made in block 224, the compound tasks may be fixed (in block 212), the inventory may be fixed (in block 216), and/or the workflows may be fixed in block 220. The process then repeats until the developed workflows pass the test of block 222.

In block 226, the SI develops a method for populating the inventory database with the actual hardware/software resources available to the SP. This inventory population mechanism represents the entity that actually inventories the real-world resources of the SP and provides such inventory data in an inventory database for service activation use. In block 228/230, the inventory population mechanism is tested. If the inventory population mechanism does not function as expected, the SI may need to fix the inventory population mechanism (back in block 226). On the other hand, if the inventory population mechanism functions as expected, the SI then develops any necessary integration (232) between activation solution and the customer's existing operation support systems (OSS) components. This integration is necessary to enable the activation solution to receive the actual user requirements during execution of the activation solution, for example. At this point, the SI can deploy the developed activation solution at the SP site for use by the SP in activating commercial network service for its customers (block 234). The SI may further document the activation solution (block 236) as well as perform any further quality control test at the production site, i.e., within the SP environment (block 238).

As can be appreciated from FIG. 2, the current process for creating an activation solution for a SP is quite complex and laborious. In essence, every activation solution is custom-crafted starting from the atomic tasks. Accordingly, the activation solution creation process remains an expensive and time-consuming endeavor.

What is desired, therefore, is an improved framework, arrangement, and/or process for creating activation solutions for SP's. The improved framework, arrangement, and/or process would ideally allow a SI to create and deliver an activation solution to a SP with less effort, in less time, and at a lower cost.

SUMMARY OF THE INVENTION

The invention relates, in one embodiment, to an article of manufacture comprising a program storage medium having computer readable code embodied therein. The computer readable code is configured to create an activation solution for commercial network services. The activation solution is configured to activate a specific commercial network service responsive to a commercial network service specification. There is included computer readable code for accessing a plurality of building block archive files, at least one of the plurality of building block archive files including information pertaining to at least two of a plug-in component, a compound task component, a workflow component, a resource definition file component, and an auto-discovery component. The plurality of building block archive files pertain to subsolutions of the commercial network services. Selected ones of the plurality of building block archive files are combinable to create a commercial network service There is further included computer readable code implementing logic for combining the selected ones of the plurality of building block archive files. The logic combines components in the selected ones of the plurality of building block archive files by component type. There is additionally included computer readable code implementing a user interface for enabling a human operator to select the selected ones of the plurality of building block archive files among the plurality of building block archive files.

In another embodiment, the invention relates to a method of creating an activation solution for commercial network services. The activation solution is configured to activate a specific commercial network service responsive to a commercial network service specification. There is included providing a plurality of building block archive files, at least one of the plurality of building block archive files including information pertaining to at least two of a plug-in component, a compound task component, a workflow component, a resource definition file component, and an auto-discovery component. The plurality of building block archive files pertain to subsolutions of the commercial network services. Selected ones of the plurality of building block archive files are combinable to create a commercial network service.

The method further includes providing logic for combining the selected ones of the plurality of building block archive files. The logic combines components in the selected ones of the plurality of building block archive files by component type. The method additionally includes providing a user interface for selecting the selected ones of the plurality of building block archive files among the plurality of building block archive files and for combining the selected ones of the plurality of building block archive files using the logic.

In yet another embodiment, the invention relates to a method of creating an activation solution for commercial network services. The activation solution, when deployed on behalf of a service provider, is configured to activate a given commercial network service that satisfies a set of received commercial network service specification from a customer of the service provider. The method includes providing a plurality of building block archive files, each of the plurality of building block archive files representing a higher level of abstraction than an atomic task level, each of the plurality of building block archive files including information pertaining to at least one of a plug-in component, a compound task component, a workflow component, a resource definition file component, and an auto-discovery component. The plurality of building block archive files pertain to subsolutions of the commercial network services. Selected ones of the plurality of building block archive files are combinable to create a commercial network service.

The method further includes providing a user interface for allowing a human operator to select the selected ones of the plurality of building block archive files among the plurality of building block archive files. The method additionally includes providing logic for combining the selected ones of the plurality of building block archive files. The logic combines components in the selected ones of the plurality of building block archive files by component type.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, the inventors herein recognize that most activation solutions tend to require the performance of certain tasks and/or groups of tasks. In the prior art approach, these tasks are integrated at a low-level, e.g., starting at the atomic task level and combining the atomic tasks with other activation solution components, thereby requiring a substantial amount of time and effort on the part of the SI to create an activation solution. It is reasoned, therefore, that if certain tasks and/or groups of tasks that tend to be needed in an activation solution can be intelligently grouped to create in advance modular, reusable building blocks, these high-level building blocks can be reused in a mix-and-match manner to more rapidly create an activation solution when needed.

In accordance with one embodiment of the present invention, there is provided an innovative, modular structure for grouping and abstracting low-level tasks into a higher level building block. The higher level building blocks, called building block archive ("BAR") files, can represent different tasks and/or groups of tasks pertaining to a sub-solution of an activation solution. The building block structure is designed such that different BAR files can be combined in a mix-and-match fashion to suit the needs of a particular activation solution. All BAR files are expected to follow a pre-defined structure, and each individual BAR file itself can be created using a set of guidelines or best practices.

In accordance with one embodiment of the present invention, there is provided an innovative combination algorithm for combining multiple BAR files to create the desired activation solution. The combination algorithm removes duplicative tasks among BAR files selected for a given activation solution, and combines non-duplicative tasks to create sub-solutions for workflows, compound tasks, inventory population and inventory. These automatically created sub-solutions may then be tested and deployed at the SP's site to enable the SP to more rapidly and efficiently activate commercial network service for its customers.

Figure 3:
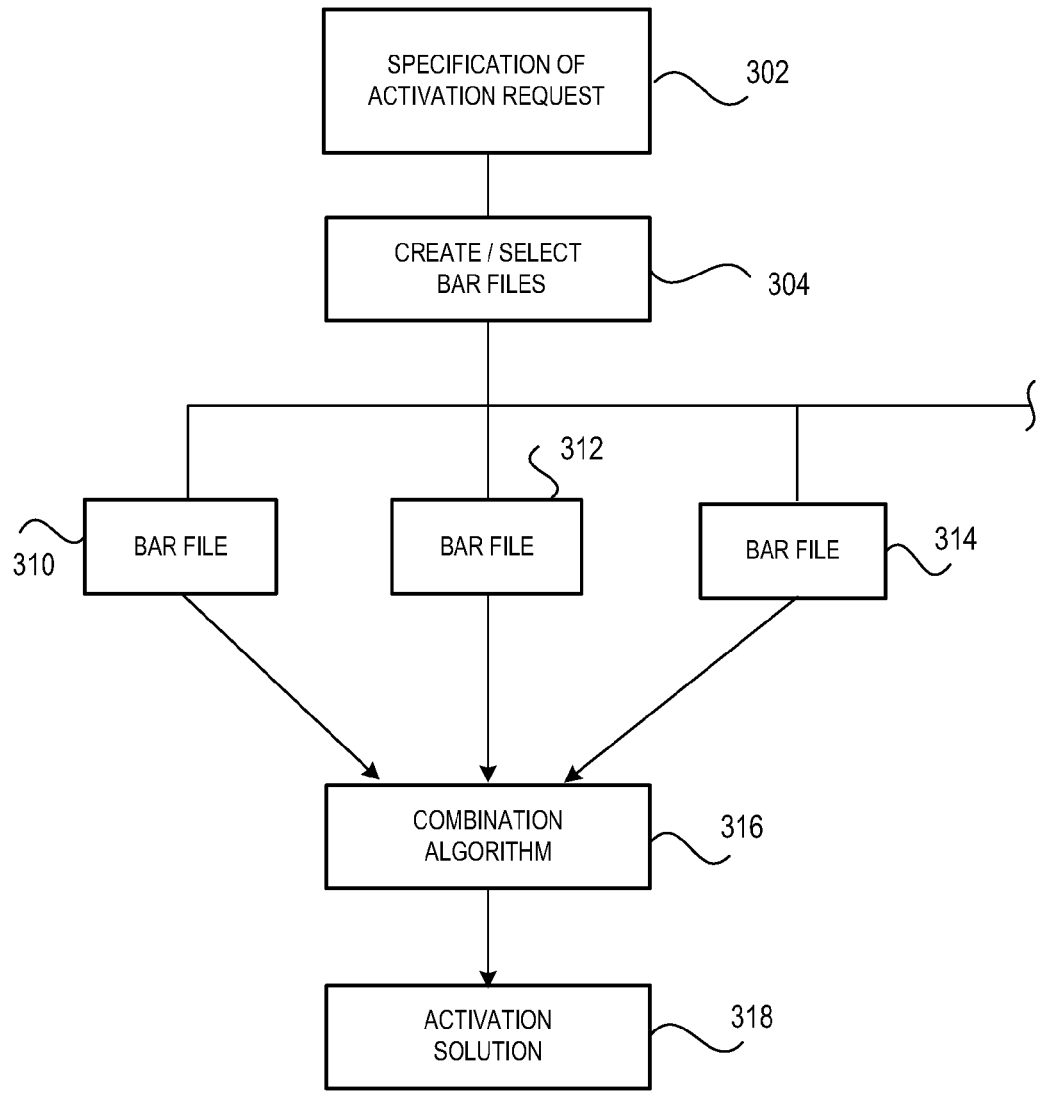
FIG. 3 shows, in accordance with one embodiment of the present invention, a high level block diagram of the major components involved in building an activation solution.

The features and advantages of the present invention may be better understood with reference to the figures and discussions that follow. FIG. 3 shows, in accordance with one embodiment of the present invention, a high level block diagram of the major components involved in building an activation solution. In block 302, the SI receives the service definition from the SP including, for example, a detailed description of the commercial network service offerings to be activated by the activation solution as well as the process steps that the SP employs to activate a commercial network service for a customer.

In step 304, the SI selects, e.g., from a library, BAR files for handling the various sub-solutions of the activation solution. For example, an activation solution for a shared web hosting service may involve different sub-solutions such as configuring one or more webservers, configuring the DNS, adding local Unix users, configure FTP servers, and the like. If a required BAR file is missing, the BAR file may be obtained from an external source (such as from other professionals involved in providing activation solutions) or the SI may elect to create a new BAR file to accomplish that given sub-solution. One exemplary set of best practices for creating a BAR file is discussed in FIG. 5 later herein.

The exemplary BAR files required for creating the activation solution in accordance with the service definition furnished by the SP are shown by reference numbers 310, 312, and 314. The various BAR files are then combined or merged via a combination algorithm 316, which automatically generates the requisite workflows, compound tasks, inventory population and inventory for the requested activation solution. The SI may then deploy the activation solution (318) at the SP site to enable the SP to activate the commercial network service for its customers.

Figure 4:
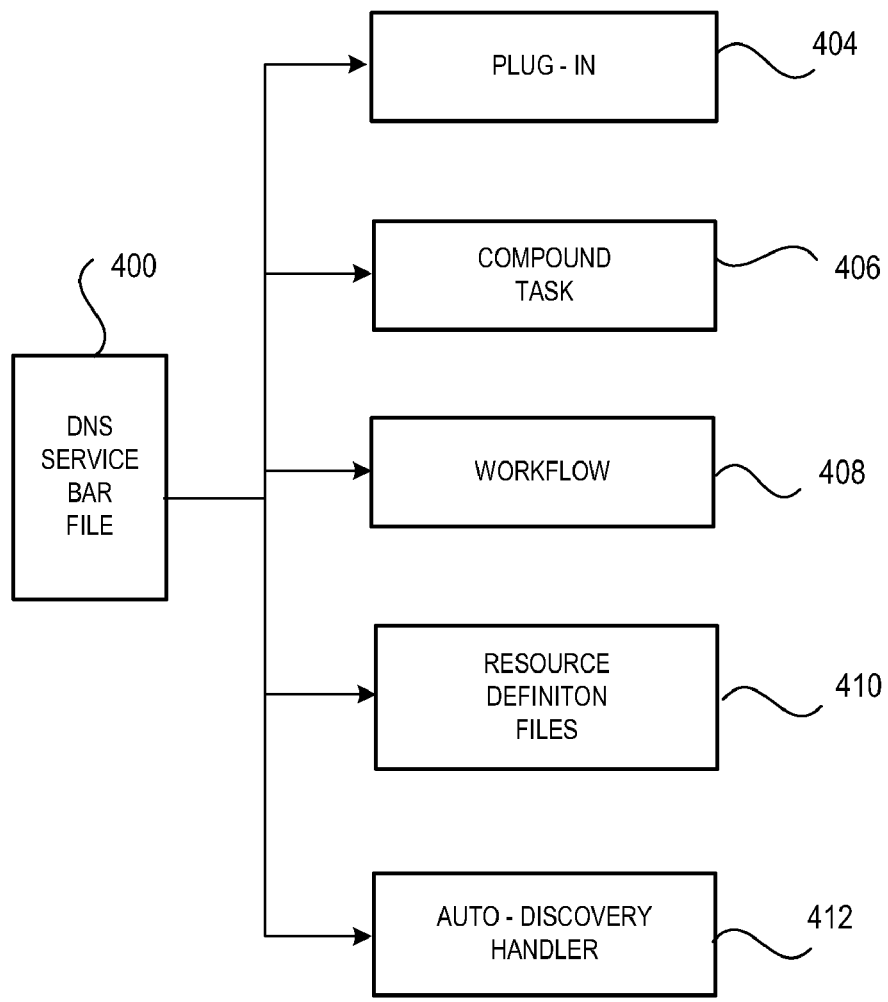
FIG. 4 shows, in accordance with one embodiment of the present invention, the structure of an exemplary building block archive (BAR) file.
Figure 5A:
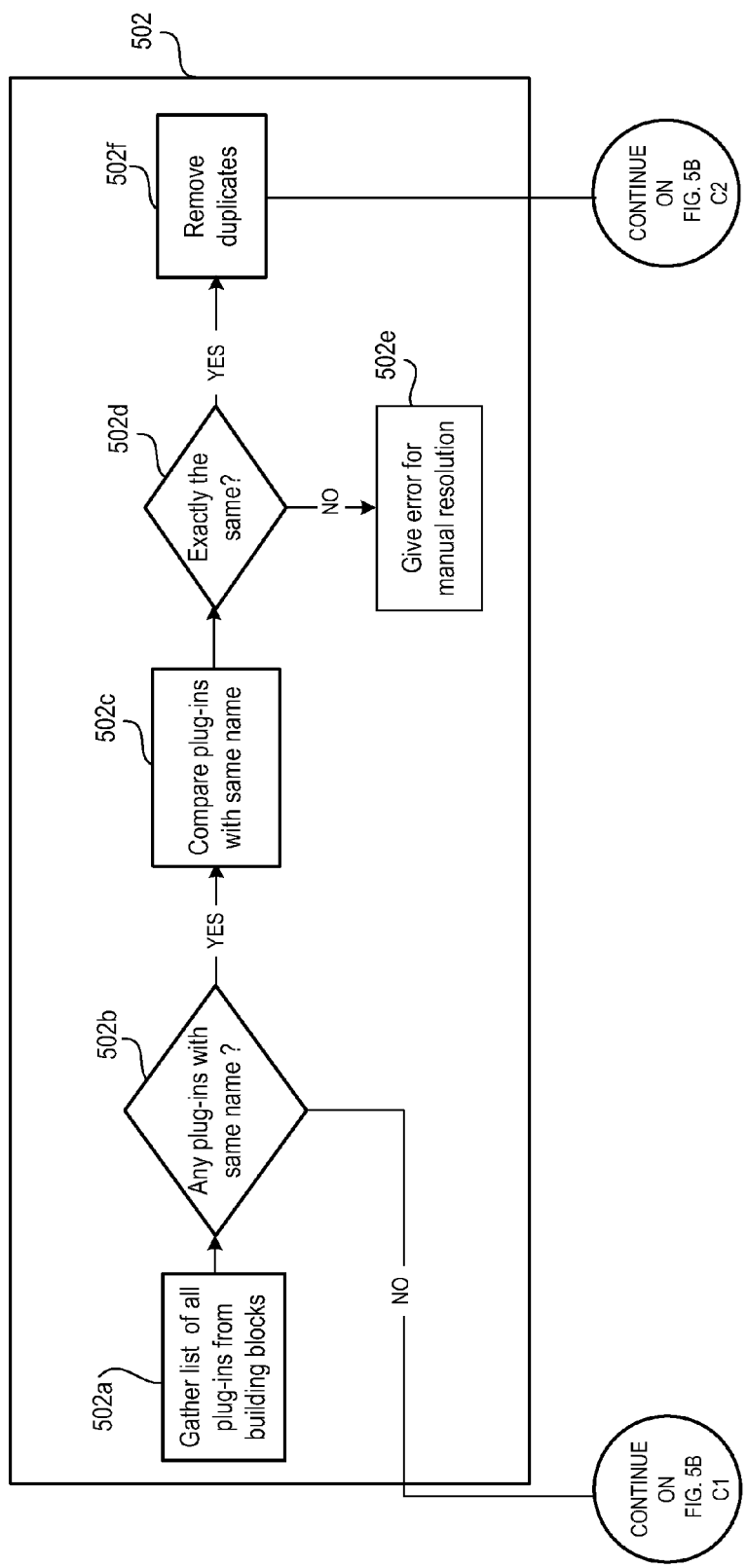
FIG. 5 shows, in accordance with one embodiment of the present invention, the algorithm for combining BAR files.
Figure 5B:
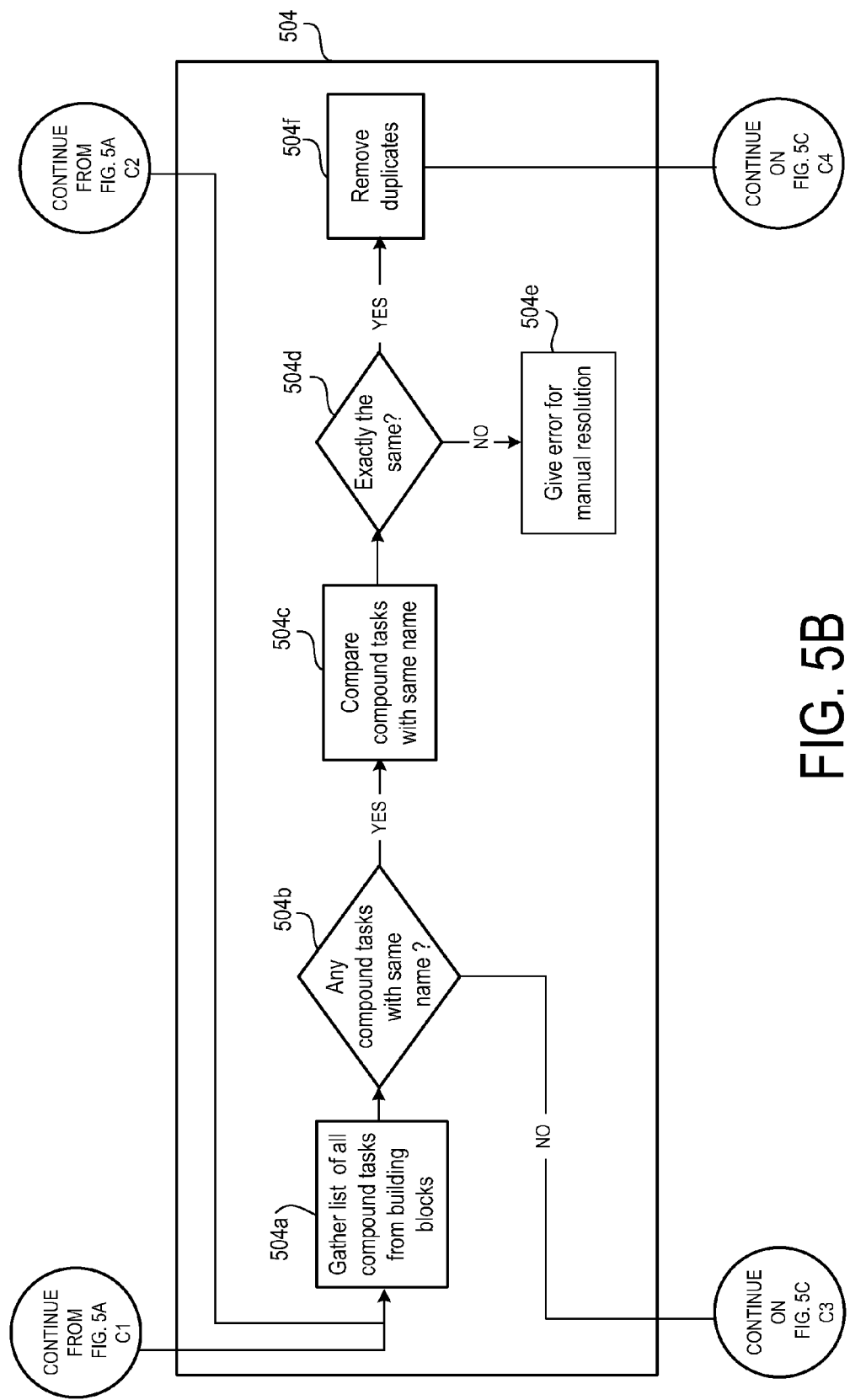
Figure 5C:
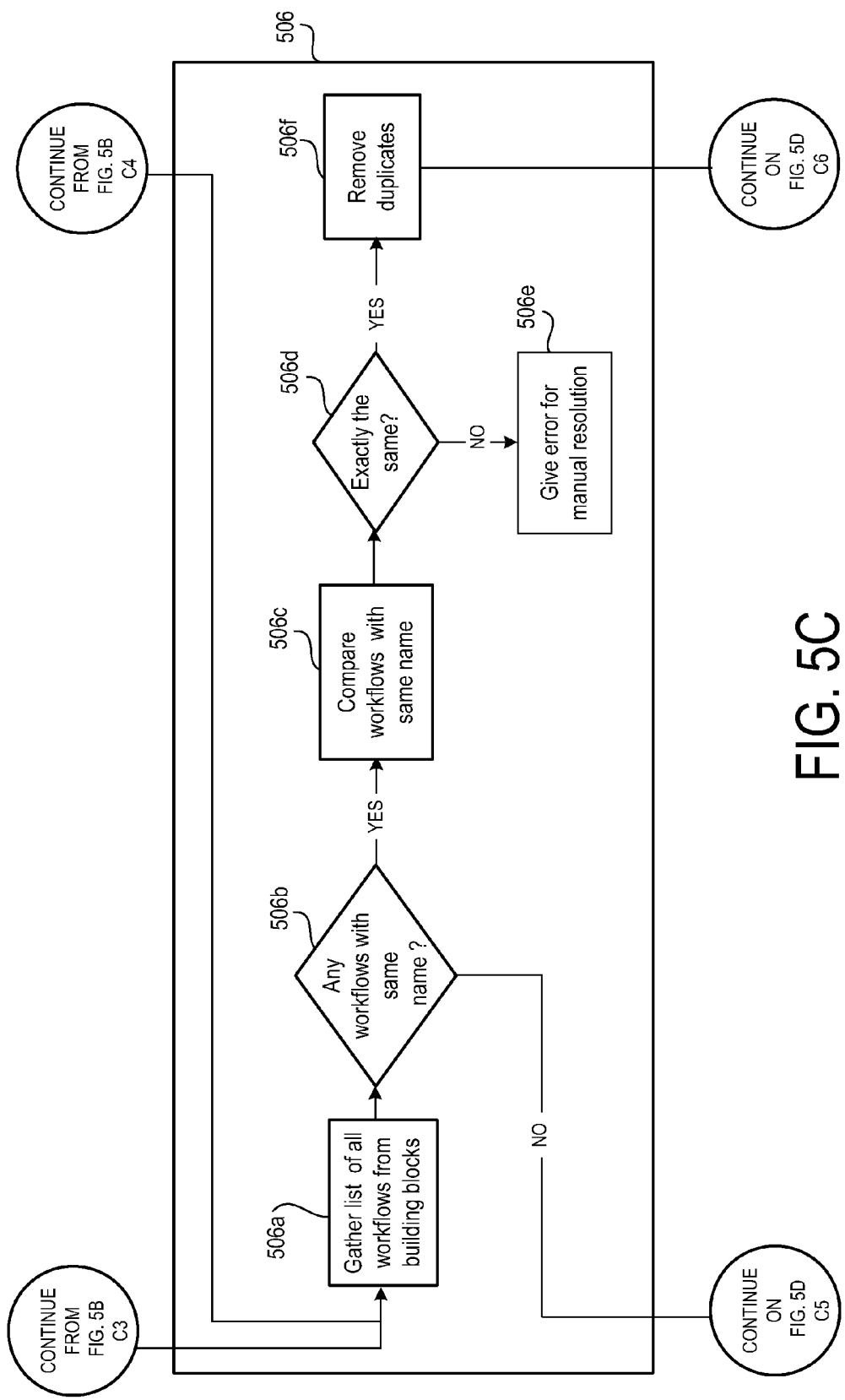
Figure 5D:
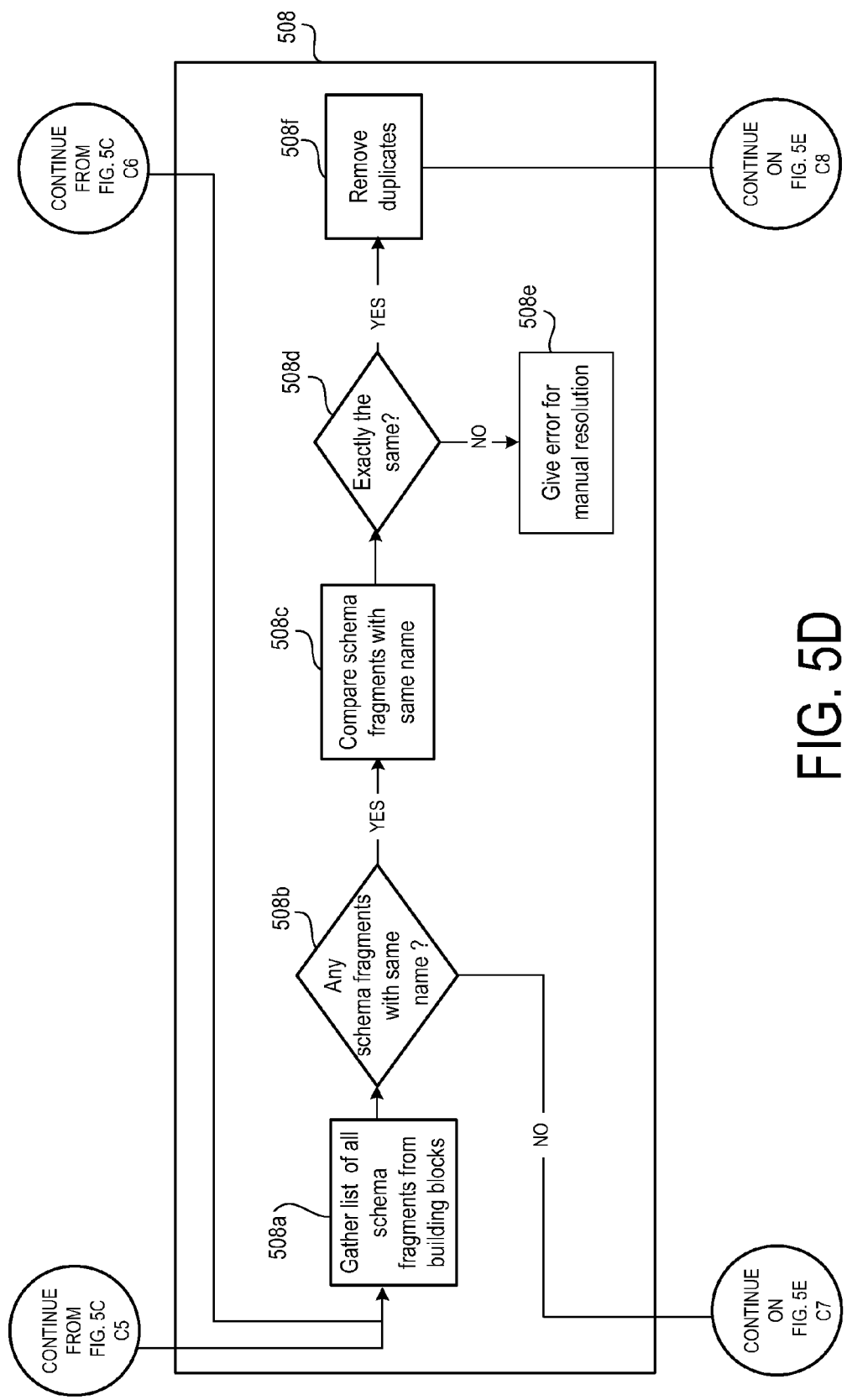
Figure 5E:
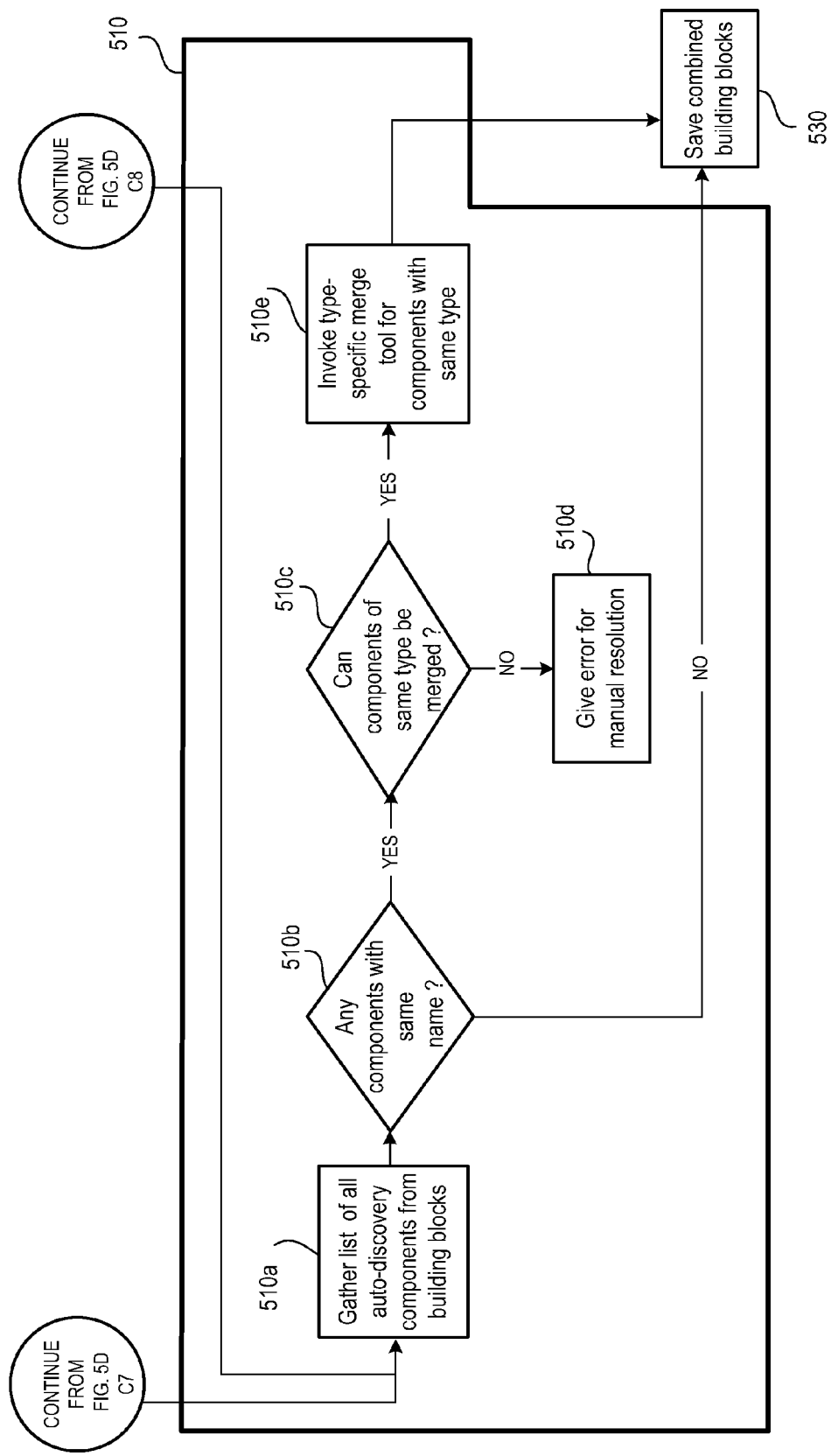

FIG. 4 shows, in accordance with one embodiment of the present invention, the structure of an exemplary building block archive (bar) file. Generally speaking, a BAR file is a file that contains components pertaining to one sub-solution of an activation solution. With reference to FIG. 4, an exemplary BAR file for managing DNS service is shown. A BAR file 400 may include data structures for storing information pertaining to one or more of the following five component types.

It is preferable that the BAR files have similar structures. However, it should be pointed out that while it is important that BAR files have a well-defined organization such that one or more of the following five component types can be readily ascertained from the BAR files by other logic that operate on the BAR files, it is not necessary for all BAR files to have the exact same structures. For example, a BAR file implementing one sub-solution may have data structures for storing information pertaining to two or three component types, while a BAR file implementing another sub-solution may have data structures for storing information pertaining to four or all five component types. Alternatively or additionally, it is possible that not all data structures in a given BAR file be populated with data and/or code. As long as the combining logic (discussed below) and/or other logic that interact with the BAR files can ascertain the component types therein and can work with the data/code associated with the various component types, the BAR files may be flexibly organized in any manner.

Plug-in component 404 represents the code or mechanism responsible for handling the atomic tasks pertaining to the sub-solution associated with BAR file 400. In the present example of FIG. 4, plug-in component 404 may represent references to selected plug-ins in an included library of plug-ins. The selected plug-ins may implement, for example, DNS. The DNS plug-in may provide atomic tasks for add zone, remove zone, reload, and the like.

Compound task 406 represents a combination of atomic tasks implemented by the plug-ins of plug-in component 404. Atomic tasks are combined in a particular sequence to accomplish the sub-solution associated with BAR file 400. Compound task 406 is a sequence of existing atomic tasks or compound tasks to call. A compound task for the DNS BAR file example of FIG. 4 may add a DNS zone for a customer to DNS, and the like.

Workflow 408 represents a coding of the business processes or steps that the SP employs to carry out the activation of the sub-solution associated with BAR file 400. A workflow for the DNS BAR file example of FIG. 4 may obtain customer information, inventory information, and invoke a compound task to add a DNS zone, and the like.

Resource definition file 410 defines the hardware and/or software resources necessary to accomplish the sub-solution associated with BAR file 400. Generally speaking, resource definition file 410 is a schema, or map, of the resources needed by the BAR file (e.g., the number and type of web servers, UNIX boxes, firewalls, and/or load balancers for the DNS BAR file example). For this reason, resource definition file may be referred to as a schema fragment. During deployment of the activation solution, specific instantiations of the actual hardware and/or software resources from the SP's resources inventory will be assigned for use to accomplish sub-solution tasks associated with the BAR file 400 in accordance with resource definition file 410. An example of a resource definition file or schema fragment may be, for example, DNS server resource definition.

Auto-discovery handler component 412 represents the code or mechanism employed to automatically discover network elements, e.g., the hardware and software resources, in the SP's network. There exists in the art a variety of different protocols and mechanisms for automatically inventorying the network elements in a network. Without an auto-discovery handler, information pertaining to the SP's hardware and/or software resources inventory would need to be obtained in some other ways, e.g., by consulting an inventory file obtained from the SP. The use of an auto-discovery handler component automates the process of obtaining accurate and up-to-date information pertaining to the hardware and/or software resources available in the SP's network, which information may then be employed during deployment to assign specific instantiations of the SP's hardware and/or software resources to BAR file 400. An example of an auto-discovery handler 412 may be, for example, code to discover DNS server in the SP network.

The aforementioned structure for BAR files is highly flexible and can advantageously be adapted to accommodate substantially all required sub-solutions for an activation solution. To create BAR files that are reusable and can be fitted together to create an activation solution, the reusable design ideas therein should be documented and preferably created using consistent, well-promulgated practices so that the reusable design ideas can be minimally modified to suit different activation needs.

As an example, if the activation solution can be analogized to a house, then the BAR files can be analogized to rooms in the house. In the prior art, one builds a house starting with sticks of lumber (atomic tasks), and develops all other components and processes to put the components together into a house. In accordance with one embodiment of the present invention, the house in the current analogy may be built with pre-built rooms (BAR files). Each room (BAR file) is tailored to accomplish a particular function (sub-solution) in the finished house (activation solution). Inside each room, the electrical wiring, floor support, etc. should be created in accordance with a consistent set of practices so that these components can be easily modified to create a house having a different electrical wiring specification or to support a heavier or lighter floor load. Similarly, the design patterns, i.e., the documented set of reusable design ideas, in a BAR file should preferably conform to consistent design practices so that the design patterns can be easily adapted to suit the needs of different activation solutions.

The following exemplary design practices may be employed to implement the design patterns in a BAR file. It should be kept in mind that the design practices discussed below are only exemplary; other design practices may be employed. First, the SI should fully understand the vertical market in which the SP operates, along with all different commercial network services that the SP wishes to deliver. The SI should also fully understand how the commercial network services can be decomposed into building blocks that can be combined in different configurations to satisfy different requirements by customers of the SP.

The building blocks need to be decomposed further into atomic tasks and compound tasks. Atomic tasks provide implementations of the primitive activation tasks that need to be performed. Correspondingly, compound tasks provide a mechanism for sequencing atomic tasks and often compound tasks to implement a higher-level activation task.

An inventory schema fragment representing information needed by the other components of the BAR file may be included. This schema fragment models the subset of total inventory information that is required by the other components but can not obtained from the SP operator or the customer's initial service request. Furthermore, the schema fragment in each BAR file should model the information in such a way that when multiple BAR files implementing different sub-solutions are combined or merged, the resultant merged schema will be cohesive and complete to handle the inventory needs of the resultant activation solution.

The BAR file may also include code or mechanisms to populate the inventory database with information obtained from the SP network environment. The information regarding the SP network environment may be obtained from different sources. For example, network information may be obtained from one source while system information may be obtained from a different source. As mentioned, the information may be discovered using an appropriate auto-discovery mechanism or may be imported as needed.

Low-level workflows may be defined and implemented to gather the necessary information and to invoke the compound tasks. The low-level workflows may obtain the required information from the following sources: 1) the inventory database as defined by the schema fragment included in the BAR file; 2) from the customer's initial service request; or 3) directly from an operator in the SP environment. It is also not uncommon for a workflow to algorithmically derive some compound task parameters from other values obtained in one of the above three manners.

Given a library of pre-built BAR files, the SI may select the BAR files needed for a particular activation solution, execute a combination algorithm to combine or merge the BAR files, and compose high-level workflows to orchestrate the invocations of low-level workflows furnished by the BAR files. The SI may then set up any incidental services required by the SP (such as billing) to complete the activation solution for the SP.

FIG. 5 shows, in accordance with one embodiment of the present invention, the algorithm for combining BAR files. At a high level, the algorithm analyzes the library or list of BAR files furnished to remove duplicate components and merge other components in order to come up with a solution subset for the activation solution.

Since each BAR file has a consistent structure known to the algorithm irrespective of the specific sub-solution that it implements, the algorithm handles each component separately, i.e., it combines the components by component type. When all components are processed, the combination algorithm is completed.

Referring now to FIG. 5, the plug-in component, the compound task component, the workflow component, the schema fragment component, and the auto-discovery components are combined by blocks 502, 504, 506, 508, and 510 respectively. In block 502, the plug-ins from the various building blocks, or BAR files, are combined. Thus, in block 502a, the list of all plug-ins from the various building blocks is obtained. In block 502b, the names of the plug-ins are analyzed to determine whether there are any duplicate names. Since duplicate names denote duplications of plug-ins, if there are no duplicate names, the plug-ins obtained in block 502a are assumed to be unique, and the algorithm proceeds to block 504 to begin combining the compound tasks.

On the other hand, if there are duplicate names in the plug-in list, the algorithm proceeds to resolve the potential duplication. Thus, in block 502c, the plug-ins having the same name are compared. If they contain the same content, or code, all the duplicate plug-ins are removed from the solution subset (blocks 502d and 502f). After all duplicate plug-ins are removed, the plug-ins remaining in the solution subset are therefore all unique and the algorithm proceeds to block 504 to begin combining the compound tasks. On the other hand, if the content, or code, of plug-ins having the same name are different (as determined in block 502d), there is an error and such error is then flagged for resolution by the SI (block 502e).

In blocks 504, 506, and 508, the compound tasks, workflows, and schema fragments are similarly processed.

In block 510, the auto-discovery components from various building blocks are combined. Since auto-discovery components may not be self-contained in individual BAR files, and different auto-discovery components from different BAR files can perform different auto-discovery related functions on the same network node, for example, the elimination of an auto-discovery component may leave the combined solution subset incomplete.

In accordance with one embodiment of the present invention, the auto-discovery components are sorted by types, and auto-discovery components of the same type are combined by type-specific merge tools. Thus, in block 510a, the list of all auto-discovery components from the various building blocks is obtained. In block 510b, auto-discovery components having the same type are ascertained.

Generally speaking, two or more auto-discovery components are deemed to have the same type if they relate to the same network component. For example, multiple auto-discovery components are deemed to have the same type if they pertain to the network node manager component in the SP network. In block 510, it is ascertained whether any of the type-specific merging tools available to the combination algorithm can merge the auto-discovery components having the same given type. A type-specific merging tool may have built-in intelligence regarding how to merge auto-discovery components having a certain type. Alternatively or additionally, the merging tool may implement a framework in which different type-specific merging modules can be installed to handle the merging task for different types of auto-discovery components.

If there is no type-specific merging tool capable of handling the merging task for a group of auto-discovery components related to the same type, the SI may be alerted for a manual resolution of the merging need in block 510d. On the other hand, if such a type-specific merging tool exists, the type-specific merging tool is employed to merge the group of auto-discovery components related to the same type in order to come up with a merged auto-discovery component for that type. Once all groups are merged, the result is a list of auto-discovery components, whose members of the list are unique by type.

Note that the combinations performed for the plug-in components, the compound-task components, the workflow components, the schema fragment components, and the auto-discovery components in blocks 502, 504, 506, 508, and 510 may be performed in any order or even parallelly. For example, it is possible to perform the workflow combination of block 506 prior to performing the plug-in combination of block 502 or to perform these combinations in parallel.

After the components in the selected BAR files are combined, the result is a set of combined building blocks, or BAR files, with redundancy components eliminated and components having the same type combined.

Figure 6A:
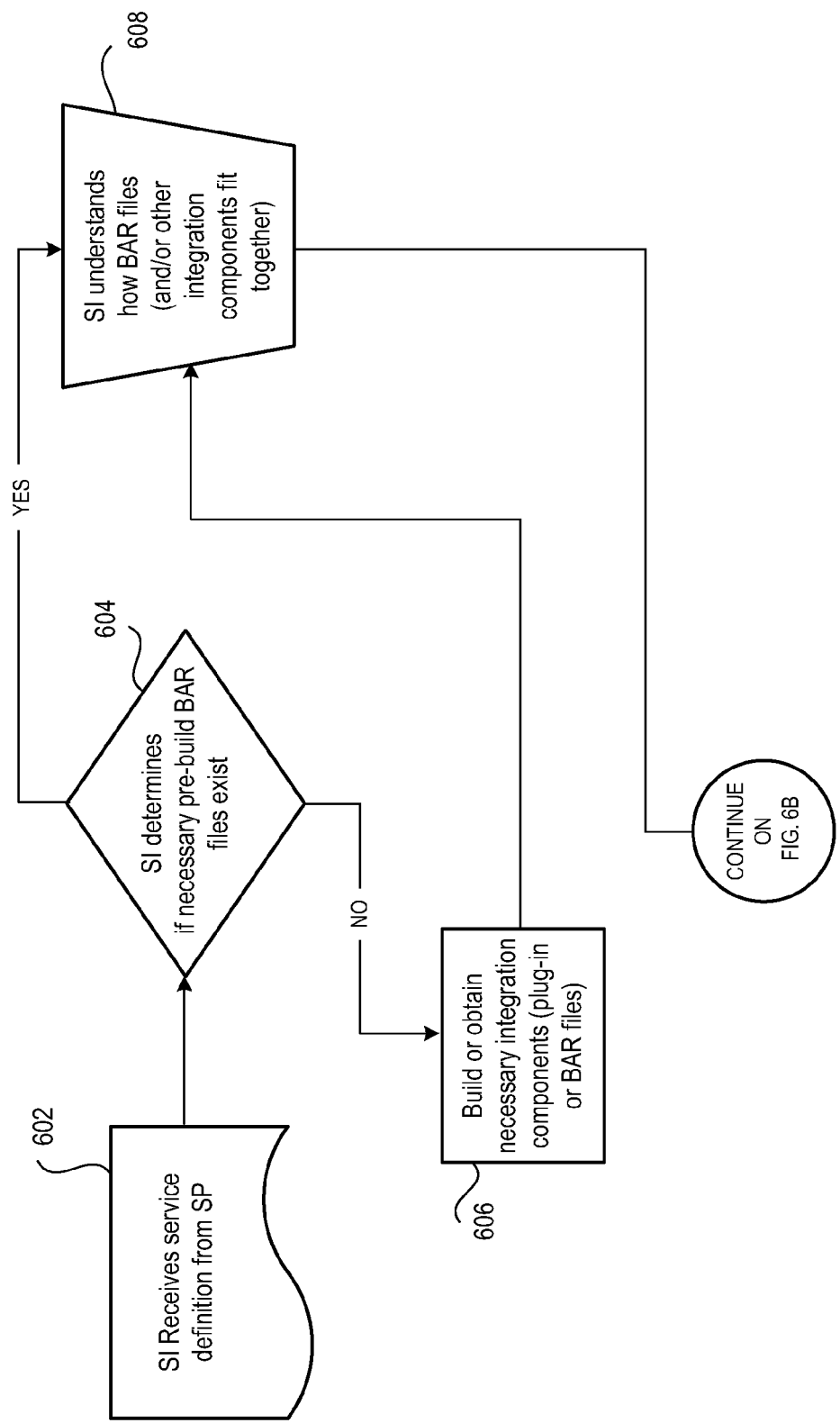
FIG. 6 is a flowchart illustrating, in accordance with one embodiment of the present invention, the steps for creating an activation solution for a SP.
Figure 6B:
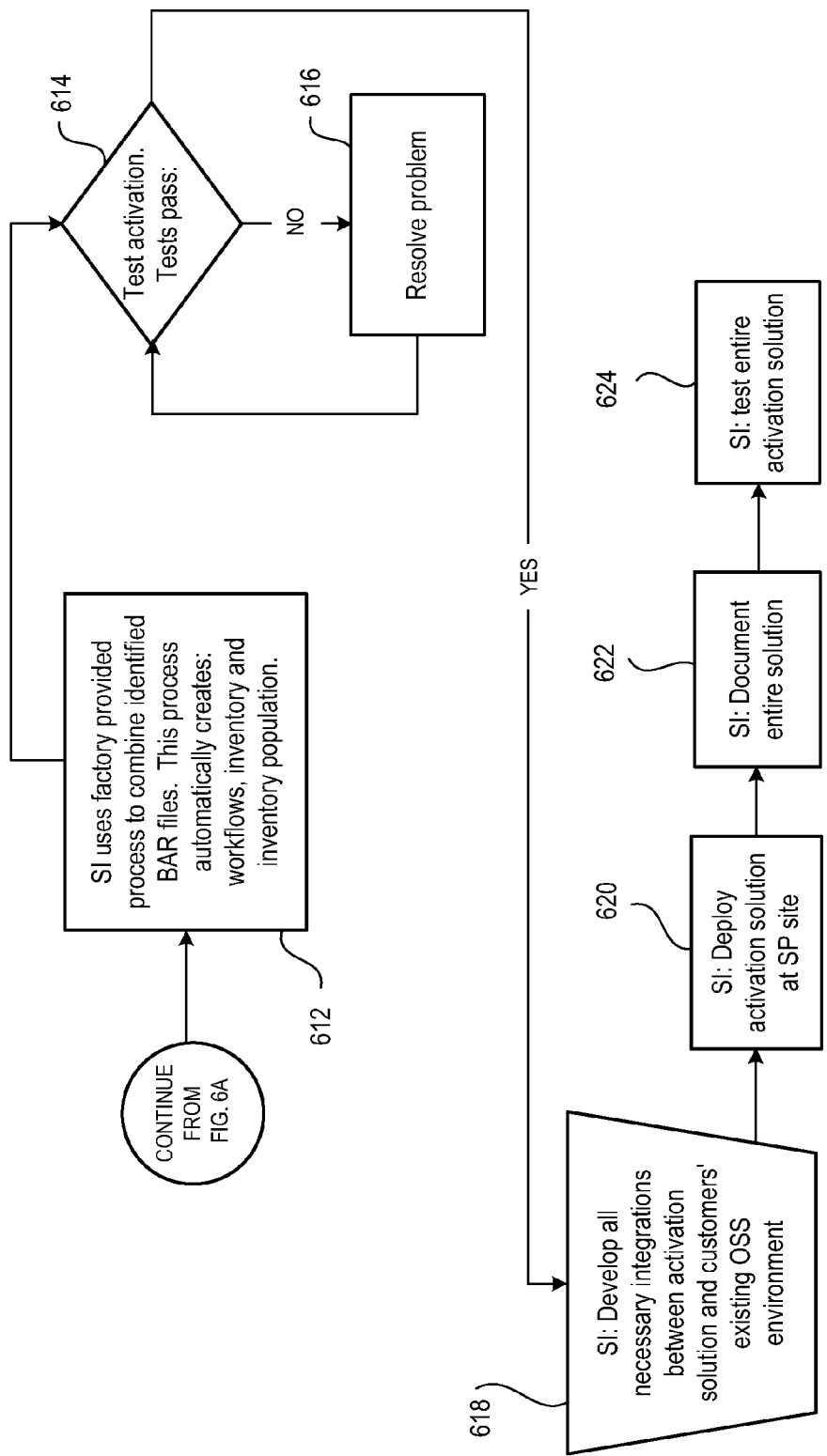

FIG. 6 is a flowchart illustrating, in accordance with one embodiment of the present invention, the steps for creating an activation solution for a SP. In block 602, the SI receives the service definition from the SP, including a detailed description of the commercial network service offerings to be activated by the activation solution as well as the process steps that the SP employs to activate a commercial network service for a customer.

In block 604, the SI analyzes the service definition furnished by the SP to determine whether there existed integration components (i.e., pre-built BAR files and/or plug-ins) for handling some or all of the tasks to be performed in activating a service. This selection may be performed using an appropriate user interface, for example. If a required BAR file and/or plug-in is missing, the SI may create (606) the necessary BAR files and/or plug-ins or may obtain the BAR files and/or plug-ins, e.g., from other service activator professionals who may sell or share such plug-ins. The SI may choose to create a BAR file instead of creating one or more plug-ins in step 606 if, for example, the SI anticipates that the sub-solution implemented by the BAR file may be reusable in other activation solutions.

Once all the integration components (i.e., pre-built BAR files and/or plug-ins) are ascertained to be available, the SI then analyzes (608) to gain an understanding of how the integration components (i.e., pre-built BAR files and/or plug-ins) may be combined together.

In block 612, the selected BAR files are preferably combined using the factory-provided combination algorithm. The combination algorithm automatically combines workflows, plug-ins, compound tasks, inventory, and auto-discovery components.

In block 614, the resultant activation solution is tested for functionality and/or any other quality control parameters. If the test fails, the activation solution problem is resolved in block 616, and the resultant activation solution is retested again in block 614. On the other hand, if the test of block 614 passes, the SI then develops any necessary integration (618)

between activation solution and the customer's existing operation support systems (OSS) components. This integration is necessary to enable the activation solution to receive the actual user requirements during execution of the activation solution, for example.

At this point, the SI can deploy the developed activation solution at the SP site for use by the SP in activating commercial network service for its customers (block 620). The SI may further document the activation solution (block 622) as well as perform any further quality control test at the production site, i.e., in the SP environment (block 624).

Figure 1:
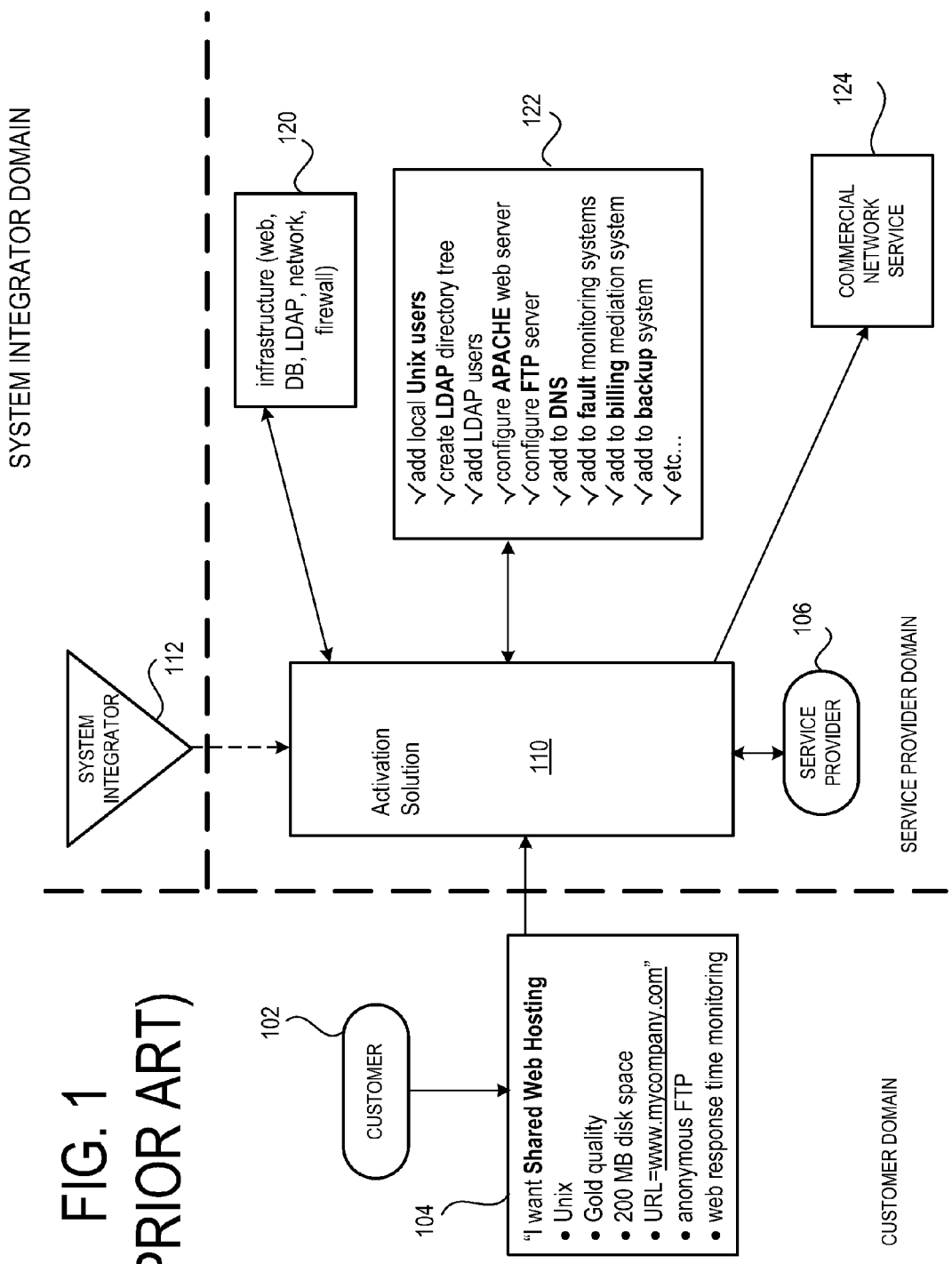
FIG. 1 illustrates the relationship between system integrators ("SI's"), service providers ("SP's") and the SP's customers in the context of service activation.
Figure 2A:
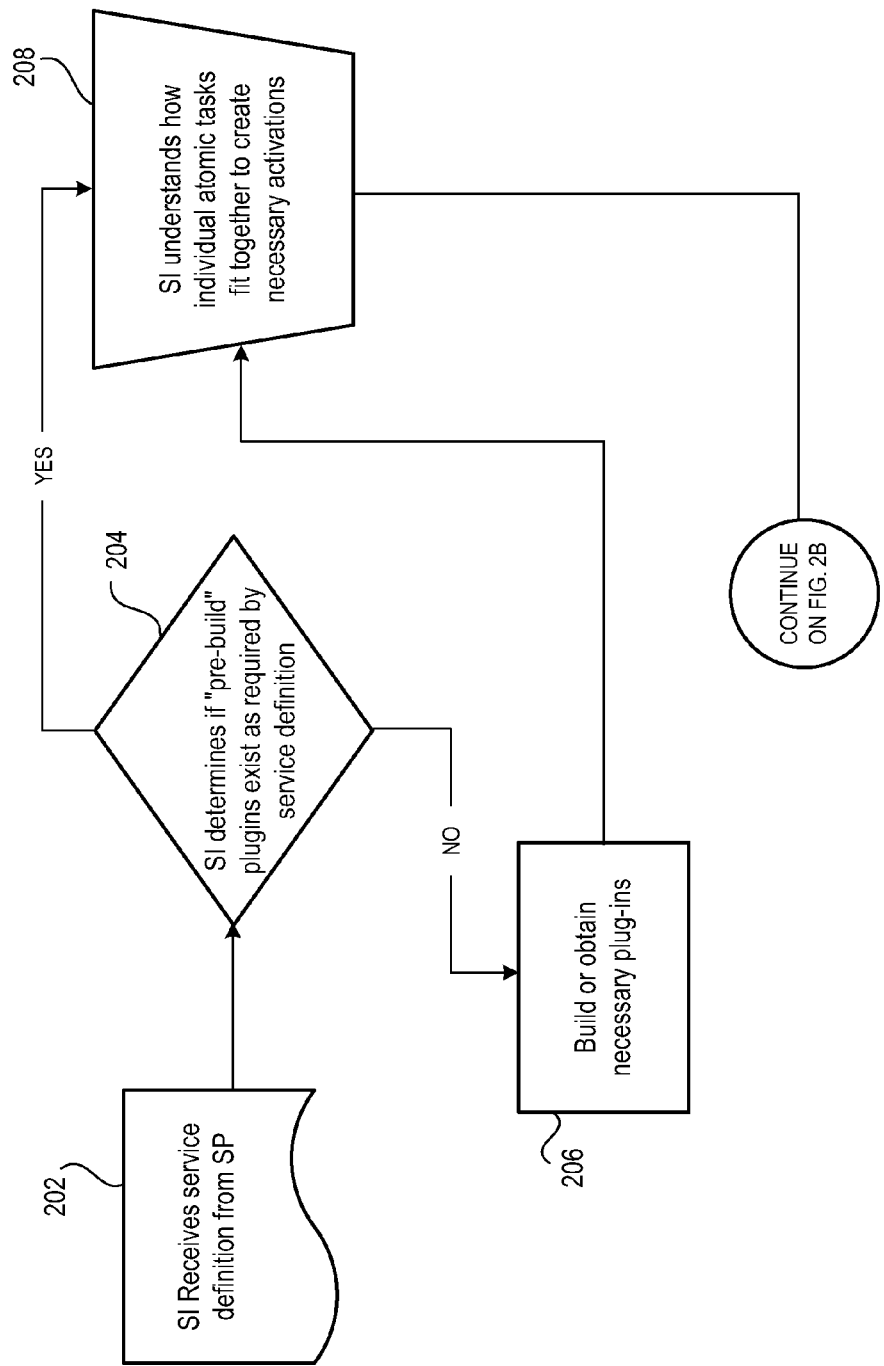
FIG. 2 is a flowchart illustrating a typical activation solution creation process, which is performed by a SI to create an activation solution for a SP.
Figure 2B:
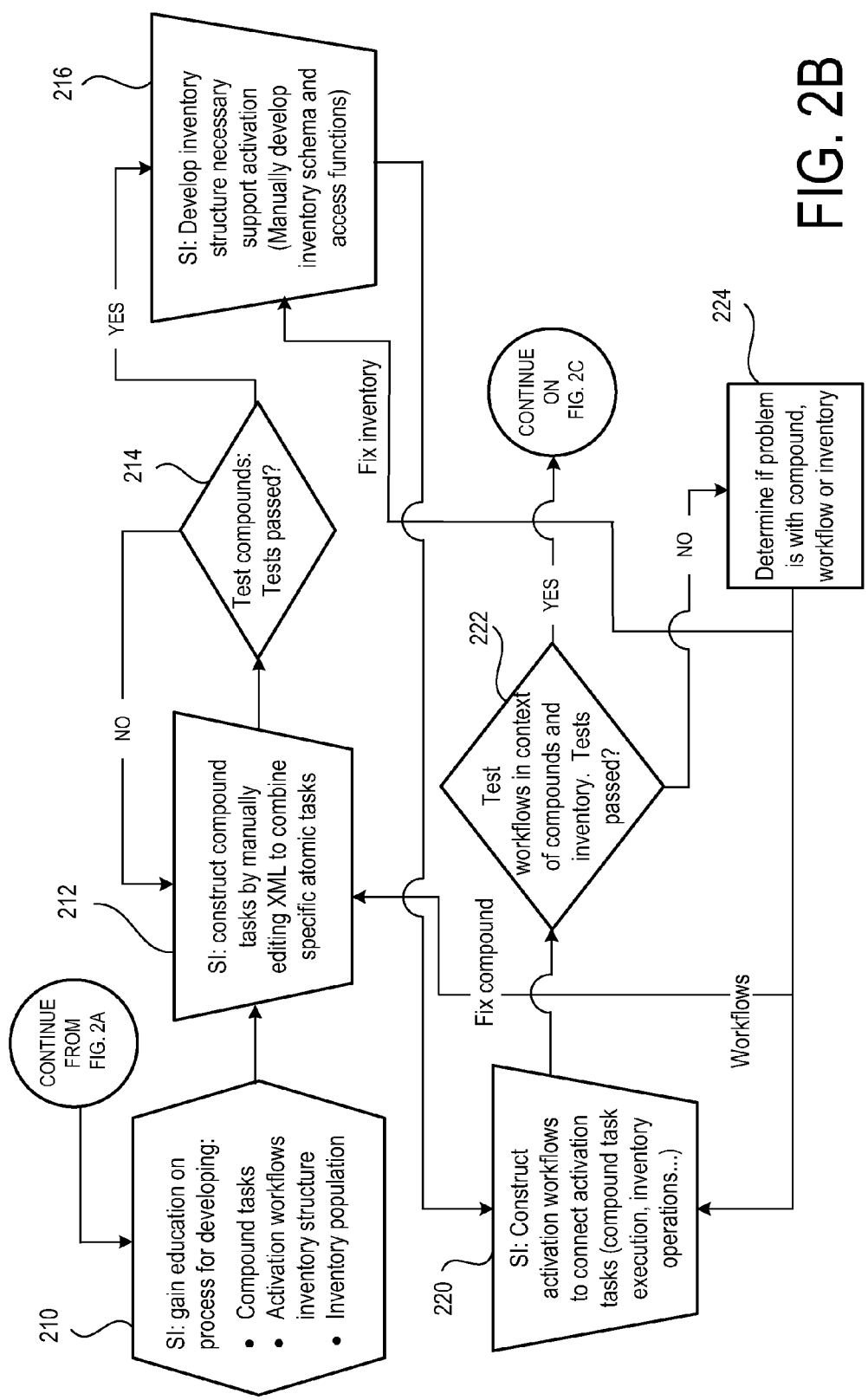
Figure 2C:
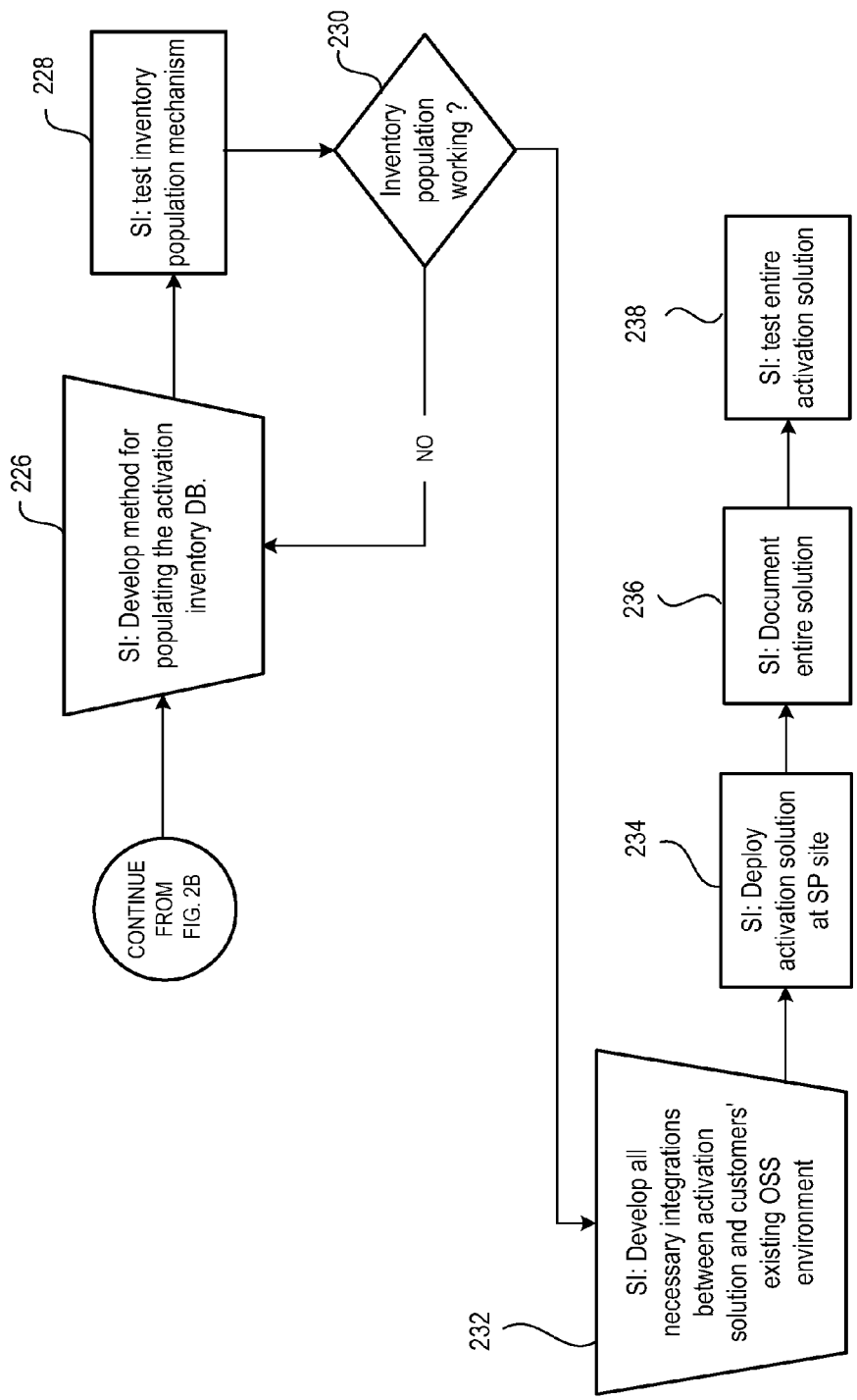

As can be appreciated from FIG. 6, the inventive process for creating an activation solution for a SP is substantially less complex than the prior art process, e.g., that discussed in connection with FIG. 2. Since the BAR files encapsulate the schema fragments, plug-ins, compound tasks, workflows and optionally auto-discovery mechanism necessary for implementing a sub-solution, a relatively fewer number of BAR files is required to implement the set of tasks required by the activation solution. With fewer BAR files to integrate, the integration can be performed at a high level and substantially fewer integration steps are required. In contrast, the SI must acquire and integrate a much larger number of schemas, plug-ins, compound tasks and workflows for the various tasks associated with the activation solution.

Furthermore, the BAR files are created in a manner that promotes integration and reuse. Since the BAR files have a consistent, known structure, the task of integrating multiple BAR files is substantially simplified. If a pre-existing BAR file needs to be modified to suit the needs of a given activation solution, the fact that the BAR files have a consistent structure and were created in conformance with consistent practices substantially simplifies the modification task. These factors enable the SI to reuse BAR files and to integrate the BAR files at a high level to more quickly create the required activation solution.

While this invention has been described in terms of several preferred embodiments, there are alterations, permutations, and equivalents which fall within the scope of this invention. For example, while certain portions of the invention are described as steps, some or all of these steps may be implemented as data and/or code stored in a computer readable medium to be executed using an appropriate computer. As another example, although the commercial network service of the example herein relates to web hosting service, the invention may also be employed to create activation solutions for other types of commercial network service, such as telecommunication service, either wired or wireless, for customers of a telecommunication service provider. Additionally, it is contemplated that the invention may also be employed to create activation solutions for any type of provisioning within the computer machine domain. Such transactions include, for example, new-employee/leaving-employee provisioning (create/delete e-mail account, account logon, etc.). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An article of manufacture comprising a program storage medium having computer readable code embodied therein, said computer readable code being configured for creating an activation solution for commercial network services, said activation solution being configured to activate a specific commercial network service responsive to a commercial network service specification, comprising:

computer readable code for accessing a plurality of building block archive (BAR) files, at least one of said plurality of BAR files including information pertaining to at least two of a plug-in component, a compound task component, a workflow component, a resource definition file component, and an auto-discovery component, said plurality of BAR files pertaining to subsolutions of said commercial network services, selected ones of said plurality of BAR files being combinable to facilitate creating a commercial network service;

computer readable code implementing logic for combining said selected ones of said plurality of BAR files, said logic combining components in said selected ones of said plurality of BAR files by component type; and computer readable code implementing a user interface, said user interface enabling a human operator to select said selected ones of said plurality of BAR files among said plurality of BAR files to facilitate said combining.

2. The article of manufacture of claim 1 wherein said at least one of said plurality of BAR files including information pertaining to at least three of said plug-in component, said compound task component, said workflow component, said resource definition file component, and said auto-discovery component.

3. The article of manufacture of claim 1 wherein said at least one of said plurality of BAR files including information pertaining to at least four of said plug-in component, said compound task component, said workflow component, said resource definition file component, and said auto-discovery component.

4. The article of manufacture of claim 1 wherein said at least on of said plurality of BAR files including information pertaining to said plug-in component, said compound task component, said workflow component, said resource definition file component, and said auto-discovery component.

5. The article of manufacture of claim 1 wherein said computer readable code for implementing said logic includes computer readable code for removing duplicate components of the same type having the same information.

6. The article of manufacture of claim 1 wherein said computer readable code for removing includes computer readable code for ascertaining whether said components of the same type have the same name.

7. The article of manufacture of claim 6 wherein said computer readable code for removing includes computer readable code for flagging components of the same type having the same name but different information for resolution by a human operator.

8. The article of manufacture of claim 1 wherein said commercial network services include web hosting service.

9. The article of manufacture of claim 1 wherein said commercial network services include telecommunication service.

10. The article of manufacture of claim 9 wherein said telecommunication service includes wireless telecommunication service.

11. A method of creating an activation solution for commercial network services, comprising:

providing a plurality of building block archive (BAR) files, at least one of said plurality of BAR files including information pertaining to at least two of a plug-in component, a compound task component, a workflow component, a resource definition file component, and an auto-discovery component, said plurality of BAR files pertaining to subsolutions of said commercial network services, selected ones of said plurality of BAR files being combinable to facilitate creating a commercial network service;

providing logic for combining said selected ones of said plurality of BAR files, said logic combining components in said selected ones of said plurality of BAR files by component type; and providing a user interface for selecting said selected ones of said plurality of BAR files among said plurality of BAR files to facilitate said combining.

12. The method of claim 11 wherein said at least one of said plurality of BAR files including information pertaining to at least three of said plug-in component, said compound task component, said workflow component, said resource definition file component, and said auto-discovery component.

13. The method of claim 11 wherein said at least one of said plurality of BAR files including information pertaining to at least four of said plug-in component, said compound task component, said workflow component, said resource definition file component, and said auto-discovery component.

14. The method of claim 11 wherein said at least one of said plurality of BAR files including information pertaining to said plug-in component, said compound task component, said workflow component, said resource definition file component, and said auto-discovery component.

15. The method of claim 11 wherein said logic includes code for removing duplicate components of the same type, said duplicate components of the same type having the same information.

16. The method of claim 11 wherein said removing includes ascertaining whether said components of the same type have the same name.

17. The method of claim 16 wherein said removing includes flagging components of the same type having the same name but different information for resolution by a human operator.

18. A method of creating an activation solution for commercial network services, said activation solution, when deployed on behalf of a service provider, being configured to activate a given commercial network service that satisfies a set of received commercial network service specification from a customer of said service provider, comprising:

providing a plurality of building block archive (BAR) files, each of said plurality of BAR files representing a higher level of abstraction than an atomic task level, each of said plurality of BAR files including information pertaining to at least one of a plug-in component, a compound task component, a workflow component, a resource definition file component, and an auto-discovery component, said plurality of BAR files pertaining to subsolutions of said commercial network services, selected ones of said plurality of BAR files being combinable to facilitate creating a commercial network service;

providing a user interface for allowing a human operator to select said selected ones of said plurality of BAR files among said plurality of BAR files; and providing logic for combining said selected ones of said plurality of BAR files, said logic combining components in said selected ones of said plurality of BAR files by component type.

19. The method of claim 18 further comprising:

modifying one of said plurality of BAR files to create another BAR file if none of said plurality of BAR files is deemed satisfactory for implementing a subsolution of said activation solution;

including said another BAR file as one of said selected ones of said plurality of BAR files in creating said activation solution.

20. The method of claim 18 wherein said logic includes code for removing duplicate components of the same type, said duplicate components having the same information.

21. The method of claim 18 wherein said removing includes ascertaining whether said components of the same type have the same name.

22. The method of claim 21 wherein said removing includes flagging components of the same type having the same name but different information for resolution by a human operator.

23. The method of claim 18 wherein said logic includes code for removing duplicate components of the same type if a component type of said duplicate components pertain to one of said plug-in component, said compound task component, said workflow component, and said resource definition file component, said duplicate components having the same name and the same information, said logic merges auto-discovery components of the same type using type-specific merging if said auto-discovery components of the same type are capable of being merged.

* * * * *